US011885711B2

(12) United States Patent
Bechhoefer et al.

(10) Patent No.: US 11,885,711 B2
(45) Date of Patent: Jan. 30, 2024

(54) SINGLE SENSOR VIBRATION MONITORING OF GAS TURBINE COMPONENTS

(71) Applicant: GPMS International, Inc., Cornwall, VT (US)

(72) Inventors: Eric R Bechhoefer, Cornwall, VT (US); John Taylor, Cornwall, VT (US)

(73) Assignee: GPMS International, Inc., Cornwall, VT (US)

( * ) Notice: Subject to any disclaimer, the term of this patent is extended or adjusted under 35 U.S.C. 154(b) by 0 days.

(21) Appl. No.: 17/935,679

(22) Filed: Sep. 27, 2022

(65) Prior Publication Data

US 2023/0103781 A1 Apr. 6, 2023

Related U.S. Application Data

(60) Provisional application No. 63/251,123, filed on Oct. 1, 2021.

(51) Int. Cl.
*G01M 15/14* (2006.01)
*G01M 7/02* (2006.01)

(52) U.S. Cl.
CPC ............ *G01M 15/14* (2013.01); *G01M 7/022* (2013.01)

(58) Field of Classification Search
CPC ................................ G01M 7/022; G01M 15/14
See application file for complete search history.

(56) References Cited

U.S. PATENT DOCUMENTS

| 10,168,248 | B1* | 1/2019 | Morey | G01M 13/045 |
| 11,486,483 | B1* | 11/2022 | Bechhoefer | F16H 59/38 |
| 2005/0284225 | A1* | 12/2005 | Luo | F03D 15/10 |
| | | | | 73/593 |
| 2017/0145852 | A1* | 5/2017 | McCune | F01D 21/003 |
| 2019/0078975 | A1* | 3/2019 | Sibbach | F16H 57/01 |
| 2020/0080476 | A1* | 3/2020 | Plante | F02C 7/36 |
| 2020/0406454 | A1* | 12/2020 | Sibbach | G01M 13/028 |
| 2021/0139167 | A1* | 5/2021 | Dunning | B64F 5/60 |
| 2022/0074349 | A1* | 3/2022 | Valois | F02C 3/10 |
| 2022/0349318 | A1* | 11/2022 | Nowoisky | F01D 21/14 |
| 2022/0375270 | A1* | 11/2022 | Khalid | F02C 7/36 |

* cited by examiner

*Primary Examiner* — Eric S. McCall
(74) *Attorney, Agent, or Firm* — STGIP, LLC

(57) ABSTRACT

Using tachometer-from-vibration processing of component signals and appropriate configuration allows for the analysis of both the compressor turbine and the power turbine of a turboshaft, turboprop, or twin spindle turbofan engine. One smart vibration sensor is positioned on or near the turbo engine and detects vibration data for components of both the gas compressor turbine and power turbine without the need for direct measurements of tachometer data from both the compressor and power turbine. From this, condition indicators are determined for monitored components on the sensor and returned to an onboard control unit.

18 Claims, 4 Drawing Sheets

SINGLE SENSOR VIBRATION MONITORING OF GAS TURBINE COMPONENTS

FIELD OF THE INVENTION

The present invention generally relates to vibration monitoring of a gas turbine engine. In particular, the present invention is directed to a system and method for vibration monitoring of gas turbine engine components using a single sensor.

BACKGROUND

Due to their light weight, high power output, and reliability, gas turbine engines are commonly used in aviation. Gas turbine engines are characterized by a compressor, a combustion section, and a turbine section. In many designs there is a free-turbine turboshaft. This is typically used on turbine shaft or turboprop gas turbine engines (although many turbofan engines are also of a twin spool design, with a similar free turbine). For turboshaft and turboprop engines, this free turbine allows power extraction from the exhaust stream. A free power turbine is not mechanically connected to the gas turbine. This allows the two turbines to operate at different speeds and is advantageous for improving efficiency when varying the load on the engine.

Gas turbine engines used in aviation have a requirement for high reliability. To support and enhance safety, a number of monitoring devices are typically used for these engines. Once such device is for chip detection. Chip detection alerts the aircraft crew to abnormal wear and potential equipment failure. Chip detectors measure ferrous debris in the engine oil. Once metal debris is in the engine oil, there is the potential for collateral damage to other rotating components in the engine. A chip detection will result in an unscheduled maintenance event that can disrupt operation and cause loss of revenue. Further, late detection of faults increases the potential for catastrophic events. As such, vibration monitoring solutions have been used as there is the potential to detect component wear earlier.

The ability to detect early wear and degradation in a gas turbine engine provides opportunities to reduced unscheduled maintenance. Removing unscheduled maintenance improves operation availability, allowing the aircraft operator to generate more revenue. More importantly, early detection and diagnosis of damage or wear enhances safety. In some circumstances, vibration monitoring will allow for virtual inspection of internal gas turbine components. This in turn will increase the maintenance interval or allow for extending time between overhauls. These changes in maintenance practices improve the ability of operators to generate revenue, while enhancing safety.

While it has been shown that vibration based condition monitoring systems enhance safety and reduce operation cost, these systems are not typically mandated on aircraft due to the cost and weight on the monitoring system. The operator of the aircraft makes a business decision about whether to install a vibration based condition monitoring system after evaluating the cost and weight of the system.

The helicopter community has long used monitoring systems, known as Health and Usage Monitoring Systems (HUMS), which may include vibration based monitoring as a function. Advanced HUMS use signal processing techniques to improve the signal-to-noise ratio of the vibration data acquired from sensors, such as an accelerometer. The vibration features associated with a fault, such as a damaged bearing, require extensive signal processing and system level information, including shaft speed and bearing geometric, to facilitate fault detection.

In general, the measured vibration from the accelerometer is the superposition of many signals. Given that a typical turboshaft engine may have ten or more shafts (which may be rotating at different rates), twelve or more gears, and over twenty bearings, the measured vibration data is complex. In many fields of analysis, the Fourier transform would be used to allow the separation of signals by frequency, in order to measure a feature indicative of component fault.

Due to the bandwidth limitation of a gas turbine control unit (e.g., full authority digital engine control (FADEC)), both the gas compressor turbine and power (free) turbine change speed continuously. This violates the assumption of stationarity required a Fourier analysis. Further, the Fourier series attempts to reconstruct a waveform as an infinite sum of cosines and sines (using the Euler formula). However, faults associated with the gears and bearings are based on impacts. In the case of a gear (e.g., having a cracked or soft tooth), the impact could be the result of breathing crack as the tooth moves through involute pair during periodic meshing. For the case of the bearing, the impact results from a roller/ball element engaging with a spall in the inner or outer race (as an example). Hence, Fourier analysis is not capable of early detection of these features associated with gear and bearings faults since they are impacts, not sinusoidal.

Vibration analysis for gears may be based on the time synchronous average (TSA), which uses a tachometer signal to resample the vibration to correct for the changes in shaft rate. For bearing analysis, the tachometer, at a minimum, is used to calculate shaft rate so that bearing fault frequencies can be calculated. For a turboshaft, turboprop, or twin spool turbojet engine, this would require two tachometer interfaces (for the compressor and turbine section) to measure speeds, and typically, two accelerometers.

SUMMARY OF THE DISCLOSURE

A system for monitoring components of an engine of an aircraft includes a gas compressor turbine of the engine, a power turbine of the engine, a turboshaft gearbox, an accessory gearbox in the turboshaft gearbox and configured to be driven by the gas compressor turbine, a power gearbox in the turboshaft gearbox and configured to be driven by the power turbine, and a sensor positioned on the turboshaft gearbox and configured to detect vibration signals related to components of both the gas compressor turbine and the power turbine. The sensor is configured to determine, based on the vibration signals, a condition indicator representative of a condition of a monitored component of the gas compressor turbine and a condition indicator representative of a condition of a monitored component of the power turbine.

A system for monitoring components of a turboshaft, turboprop, or twin spindle turbofan engine of an aircraft includes a gas compressor turbine of the engine, a power turbine of the engine, an accessory gearbox configured to be driven by the gas compressor turbine, a power gearbox configured to be driven by the power turbine, a sensor positioned on a turboshaft gearbox and configured to detect vibration signals related to both the gas compressor turbine and the power turbine, and an on-board control unit in communication with the sensor and configured to receive inputs from a plurality of instruments on the aircraft. The on-board control unit is configured to determine a current regime of the aircraft based on the inputs and wherein, based on the determined regime, the on-board control unit is configured to execute a script that directs the sensor to acquire vibration data for a specific time at a commanded sample rate for signals related to the gas compressor turbine and the power turbine.

A method for monitoring components of a turbine engine of an aircraft includes mounting a sensor on a turboshaft gearbox of the turbine engine such that the sensor is positioned to acquire vibration data related to a gas compressor turbine and a power turbine of the turbine engine, acquiring at the sensor vibration data related to the gas compressor turbine and the power turbine, determining in the sensor tachometer values for a plurality of components of the gas compressor turbine and the power turbine based on the vibration data, and determining in the sensor a condition indicator for each of the plurality of components of the gas compressor turbine and the power turbine based on the vibration data.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

Figure 1:
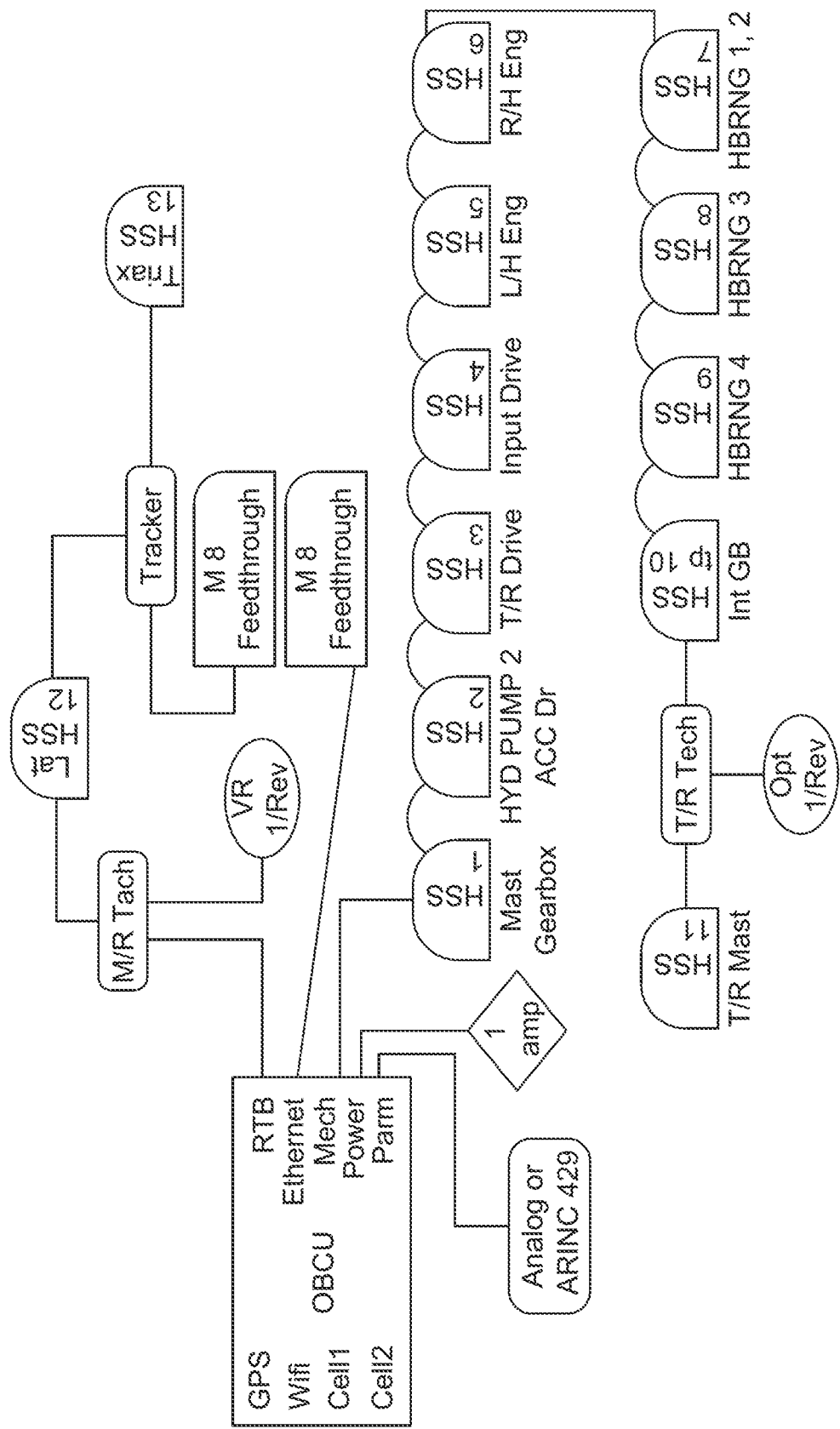
FIG. 1 is a schematic view of components of an exemplary HUMS in accordance with an embodiment of the present invention.

Using tachometer values derived from vibration data processing of component signals and appropriate configuration allows for the analysis of both the compressor and power turbine of a turboshaft, turboprop, or twin spindle turbofan engine. One smart vibration sensor can be positioned to acquire vibration data for both the gas compressor turbine and power turbine without the need for tachometer data from both the compressor and power turbine. For some systems, it is difficult to interface with the tachometer signals of the engine since they have a high design assurance level (DAL), which may not allow for splicing additional sensors into those data lines. For retrofit or cases where the tachometer signal is available, cost and weight considerations are determinative. For a dual engine HUMS, the number of sensor interface channels is reduced from four (two tachometers, two accelerometers) to one smart sensor per engine. With this system, for a single engine aircraft, only one smart sensor is required for monitoring and analyses of both the compressor and turbine section of the engine. For both single engine and dual engine aircraft, the cost and weight of HUMS is significantly reduced, which makes the installation of such a HUMS more attractive to operators.

Requirements for HUMS

To enhance safety and bring value to an aircraft operation, a HUMS may entail several functionalities in addition to vibration diagnostics. HUMS typically have the following functions:

Flight Data Monitoring (FDM), which includes recording flight data for use in the analysis of a mishap and to support a Safety Management System (SMS).

Exceedance Monitoring (EM), which alerts the maintainer when flight manual and operation limitations are exceeded. For example, the flight manual has limits on engine RPM and operating temperatures. Exceedance monitoring automates the process of alerting when these limitations are met.

Rotor Track and Balance (RTB). Rotor balance is a common maintenance event for helicopters. When a blade is changed, or scheduled maintenance requires it, the maintainer will perform a rotor balance event. A HUMS equipped aircraft reduces the maintainer burden by allowing the collection of vibration data automatically and providing a balance solution. This RTB capability directly impacts maintenance cost by reducing the time required for each event by as much as 80%.

Mechanical Diagnostics/Prognostics. This function uses configuration data, coupled with tachometer/vibration data, for each monitoring component to calculate condition indicators (CIs). CIs are stastical values that reflect the condition of the monitored component. As the component wears and is damaged, the CIs values change, which allows thresholding, trending, and an ability to predict the remaining useful life on the component.

Engine Performance Monitoring. A pilot will often enter a regime in which measuring the outside air temperature, the pressure altitude, and engine parameters (e.g., gas generator RPM, turbine outlet temperature, torque) allows the performance of the engine to be validated against a flight manual specification.

The above functions in HUMS maybe supported by a regime recognition process. Regimes reflect the aircraft state, such as if the aircraft is flying straight or level or turning. For helicopters, regime recognition can be used to automate when data is collected for RTB, when it is appropriate to collect drivetrain diagnostics, or when the aircraft has landed and it is appropriate to download data for informing the maintainer on the aircraft status.

A low cost, lightweight architecture to support HUMS is based on a data bus. A data bus allows for smart sensors to be daisy-chained where data is needed to be acquired to measure features from rotating components. Since a single data bus can support numerous sensors, the overall weight and cost are reduced. In this situation, the HUMS includes an Onboard Control Unit (OBCU) to manage the sensors, marshal data that is calculated by the sensors, and host a wireless communication module needed to download/upload the HUMS data at the end of a flight.

The OBCU also interfaces to the aircraft to collect data for FDM, to enable EM, and to provide meta data needed for sensor processing. The interface to the aircraft may be through an analog interface. Many older aircraft have only analog interfaces, which would require this type of remote data converter. The analog interface has frequency to voltage converters to measure engine gas generator RPM (NG), power turbine RPM (NP), and main rotor RPM (NR). The voltage is then measured and linearly mapped to RPM in real time. Other analog-to-digital channels are used to measure turbine outlet temperature (TOT), outside air temperature (OAT), engine torque (TORQ), and indicated airspeed. In some aircraft, the data acquisition/conversion is performed by the cockpit instruments. In these aircraft meta data is available from the cockpit instruments itself. This is usually via a standard such as ARINC 429. ARINC (Aeronautical Radio Inc.) is a technical standard for avionics that defines the physical and electrical interfaces of a two-wire data bus and a data protocol to support an aircraft's avionics local area network.

Many cockpit instruments output Global Positioning Systems (GPS) time, latitude, longitude, altitude, and attitude reference heading (AHRS) data. However, for convivence and for retrofit, the OBCU may incorporate a GPS and an inertial measurement unit to provide this data. An example schematic diagram of a HUMS for a twin-engine helicopter is shown in FIG. 1, which includes several highspeed smart sensors (e.g., HHS1-HSS13). For drivetrain diagnostics/prognostics, these sensors are placed strategically on the helicopter drivetrain, such as the:

- gearbox mast (HSS1);
- the hydraulic pump/accessory drive (HSS2);
- main gearbox tail rotor output (HSS3);
- the transmission input drive (HSS4);
- the left- and right-hand engine (HSS5, HSS6, from which both gas compressor turbine and power turbine vibration data can be measured);
- sensors for the tail rotor driveshaft hanger bearings (HSS7 through HSS9); and/or
- sensors for the intermediate and trail rotor gearbox.

A tachometer (HSS11) for the tail rotor gearbox is included in order to balance the tail rotor phase data. The smart tachometer provides for zero cross data for the tail rotor mast shaft rate and the phase relative to a target on the tail rotor. Similarly, for RTB, lateral vibration is measured by HSS12 and cockpit vertical vibration by the Tri-axial sensor HSS13. The tachometer provides phase relative to a target, which is needed for balance. The Tracker provides data on blade track height, which is used to reduce blade track split.

The OBCU also has an aircraft interface using either an analog or ARINC429 (or other suitable type) interface for parameter data. Representative parameter data collected by HUMS for a twin-engine aircraft for HUMS is listed in Table 1.

TABLE 1

| Parameter | Units |
| --- | --- |
| 1. Latitude | radians |
| 2. Longitude | radians |
| 3. Altitude | meters |
| 4. Ground Speed | knots |
| 5. Alt Rate | m/sec |
| 6. Heading | radians |
| 7. Pitch | radians |
| 8. Roll | radians |
| 9. Pitch Rate | deg/sec |
| 10. Roll Rate | deg/sec |
| 11. Yaw Rate | deg/sec |
| 12. Accel X | Gs |
| 13. Accel Y | Gs |
| 14. Accel Z | Gs |
| 15. Wander Angle | radians |
| 16. Barometric Pres | mbar |
| 17. OAT | C. |
| 18. Normalized Accel | Gs |
| 19. NG LH/Eng | % RPM |
| 20. NP LH/Eng | % RPM |

TABLE 1-continued

| Parameter | Units |
| --- | --- |
| 21. NR | % RPM |
| 22. Torq LH/Eng | % |
| 23. MGT1 LH/Eng | % |
| 24. IAS | knots |
| 25. Trans Oil Temp | C. |
| 26. Pressure Altitude | meters |
| 27. Doppler Speed | knots |
| 28. dMR/dt | % dRPM/dt |
| 29. Rad Alt | feet |
| 30. NG RH/Eng | % RPM |
| 31. NP RH/Eng | % RPM |
| 32. Torq RH/Eng | % |
| 33. MGT2 RH/Eng | C. |
| 34. Max NP | % RPM |
| 35. Total Torq | % |
| 36. Torq Split | % |
| 37. Wind Speed, | Knts |
| 38. Wind Direction | Degrees |
| 39. UTC Time | |
| 40. UTC Date | |

Highspeed Smart Sensor

A highspeed smart sensor (HSS) includes a high performance micro-electromechanical system (MEMS) accelerometer that may be packaged with both hardware and firmware to allow edge computing of condition indicators (CIs) for diagnostics. The HSS interconnect may be a daisy-chain on a data bus. In an embodiment, a four-wire data bus is used: two DC wires for power (28V) and two wires for half duplex RS-485. In addition to the accelerometer, the HSS may include:

- a 24 bit ADC and precision voltage reference for accurate data conversion, which allows sample rates up to 100,000 sps;
- a microcontroller and memory unit, which allows collection of up to 30 seconds of data at 100,000 sps and processing of that data;
- a 28V to 3.3V buck converter for power management; and
- a RS-485 transceiver for communication and transmission of data.

Figure 2:
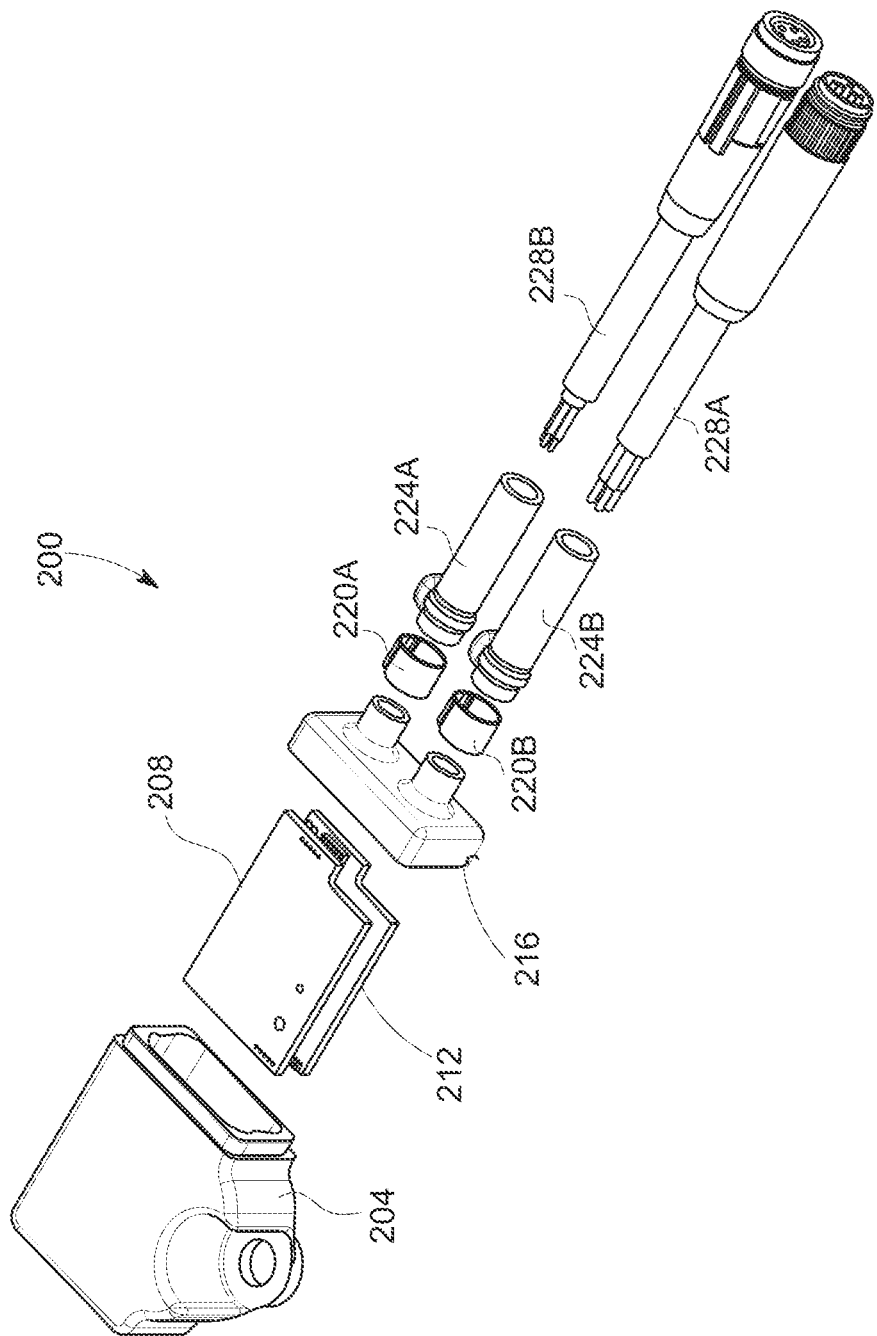
FIG. 2 is a perspective, exploded view of a highspeed smart edge sensor that may be used as part of an embodiment of the present invention.

The highspeed sensor is an edge processing device for data acquisition and the sensor may incorporate an integrated bracket. The integrated bracket is designed to replace the washers of a bolt or stud on the transmission. This reduces part count/cost and allows for a high first resonant mode (greater than 17 kHz). Vibration sensors are preferably stiffly mounted to the transmission in order to measure features assorted with wear and degradation. FIG. 2 shows an example of a highspeed sensor 200 with edge computing capability. Sensor 200 may include an accelerometer sensor mount 204 for mounting sensor 200 in an appropriate location proximate or on a gas turbine engine to monitor both the gas compressor turbine and the power turbine. Sensor 200 may also include a sensor board assembly 208, which may be supported by potting material 212. An accelerometer sensor cap 216 encloses sensor board assembly 208 and potting material 212 within mount 204 and provides connections to a pair of clamps 220 (e.g., 220A, 220B) that secure sensor leads 224 (e.g., 224A, 224B). Tubing 228 (e.g., 228A, 228B), such as heat shrink tubing, encloses wiring for sensor leads 224, which may be a male lead (e.g., 228A) or there may be both a male lead 228A and a female lead 228B if sensor 200 is incorporated into a daisy chain sensor system.

Figure 3:
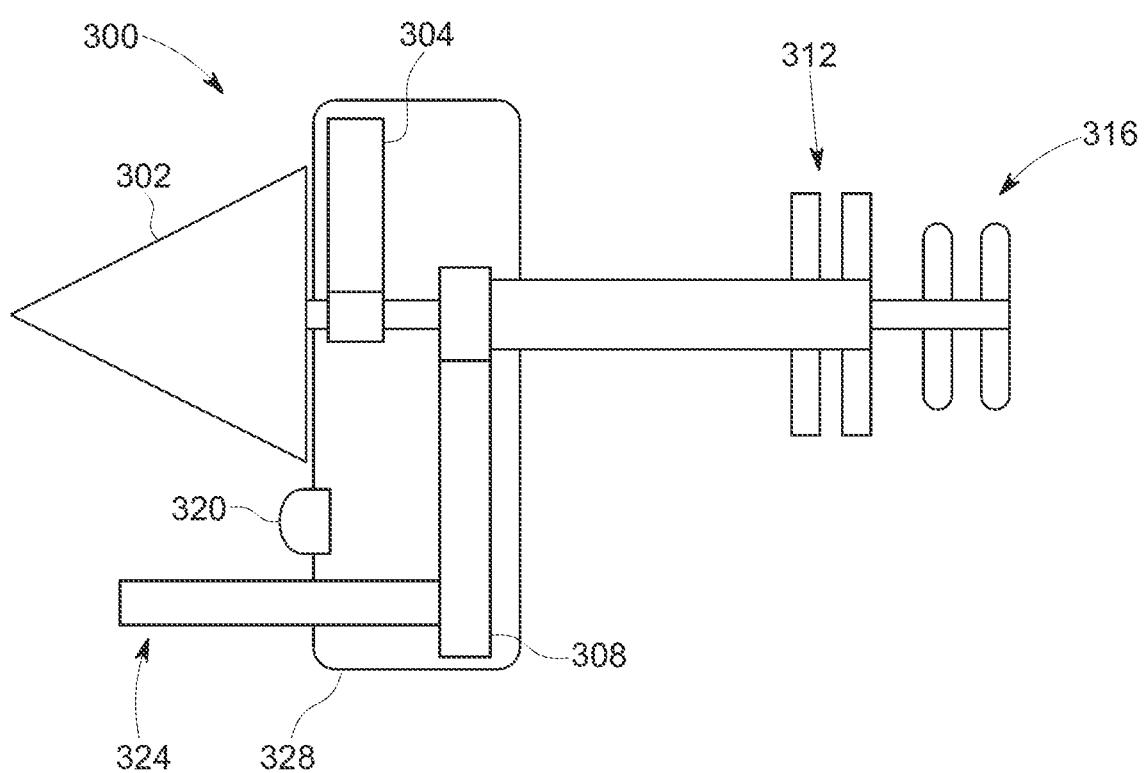
FIG. 3 is a schematic view of a gas turbine engine with a sensor in accordance with an embodiment of the present invention.

Turning to FIG. 3, a schematic diagram is shown of a selected components of a gas turbine engine 300, which includes a compressor 302, an accessory gearbox 304, a power gearbox 308, a power turbine 312, a gas producer turbine 316, an edge sensor 320, a power output 324, and a turboshaft gearbox 328. Accessory gearbox 304 is driven by gas producer turbine 316, while power gearbox 308 is driven by power turbine 312. Power gearbox 308 has a power takeoff shaft output. Sensor 320 is mounted on turboshaft gearbox 328, which allows sensor 320 to measure vibration from both accessory gearbox 304 and power gearbox 308.

Processing and Analytics for Vibration Based Diagnostics/Prognostics

Because signals emanating from fault features tend to be relatively small, extensive signal processing may be required to detect these faults. In a preferred embodiment, all processing occurs on the HSS and is based on analysis of the measured data. Structurally, each shaft has a ratio from a tachometer, and can be associated with 0 to n gears and 0 to m bearings.

Shaft and gear analyses are based on the Time Synchronous Average (TSA), which is in effect a DC filter (i.e., stationary) that removes signals generated from asynchronous components (that is, other shafts that run at a different rate than the shaft under analysis). This is done in order to identify features associated with gear faults and to accurately measure the magnitude and phase of shafts.

For each bearing associated with the shaft, the TSA also calculates the shaft rate. Part of the configuration is the bearing fault feature rate, which may be calculated in accordance with known techniques. For example, a bearing may have a cage rate of 0.43, a ball rate of 7.05, an inner race rate of 10.78, and an outer race rate of 8.22. In an example, for a power turbine shaft with calculated speed after resampling (e.g., from the TSA algorithm), the RPM was found to be 32,175, or 536.3 Hz, in which case the fault features of interest would be found at: 231, 3781, 5791, and 4408 Hz, respectively.

Figure 4:
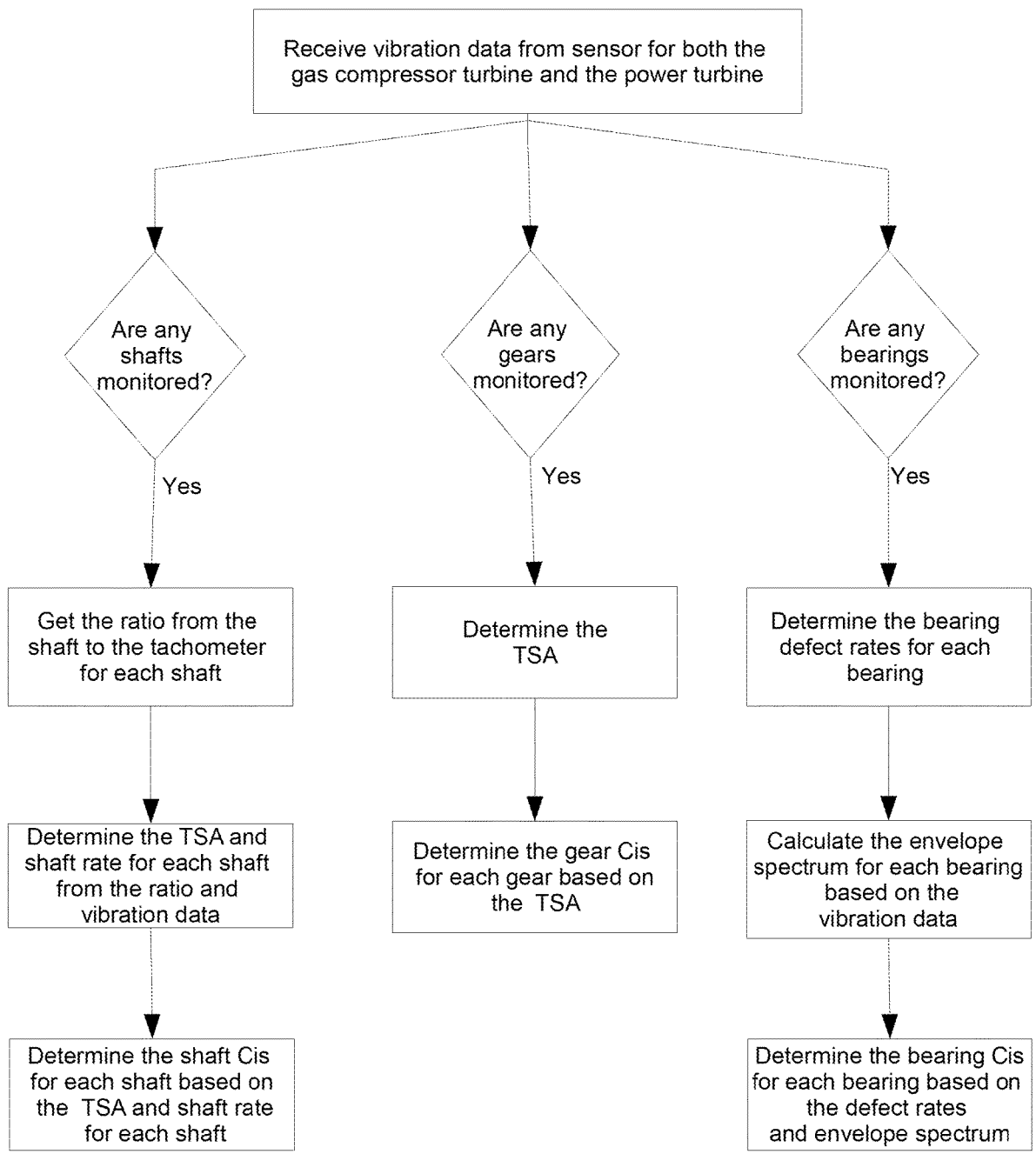
FIG. 4 is a process diagram showing an overview of processing performed as part of an embodiment of the present invention.

An overview of the processing used to determine CIs of monitored components from vibration data is outlined in FIG. 4. Vibration data is measured by the HSS mounted on the turboshaft gearbox. For each shaft to be monitored, the ratio of the shaft to the tachometer is obtained. The TSA and the shaft rate for the shafts are calculated from the vibration data. From this information, a CI for each shaft can be determined based on vibration data obtained by the sensor. For each gear monitored, a CI is determined based on the TSA. For each bearing monitored, bearing defect rates are calculated and the envelope spectrum is calculated based on the vibration data. From these values, CIs for each bearing can be determined.

The condition indicators that may be calculated for shaft analysis include:
SO1 Mag, which measures the 1/Rev Acceleration due to Imbalance,
SO2 Mag, which measures the 2/Rev Acceleration due to Bent Shaft,
SO3 Mag, which measures the 3/Rev Acceleration due to Coupling Damage,
TSA RMS, which is a Cracked Tooth Indicator,
TSA peak to peak, which is another Cracked Tooth Indicator,
The N per Rev Mag, which is a measure of the Blade Rate acceleration,
The calculated RPM, and
The Regime Index, which provides the regime in which the acquisition was taken.

Similarly, typical condition indicators for gear fault detection may include:
Residual RMS, where the Residual removes Gear Mesh of the TSA, an indicator of cracked/soft tooth,
Residual Kurtosis, where the Residual removes Gear Mesh of the TSA, an indicator of cracked/soft tooth, less sensitive to torque than RMS,
Residual Crest Factor, similarly, the Residual removes Gear Mesh of the TSA, an indicator of cracked/soft tooth, normalized for torque,
Energy Ratio which is the Ratio of Residual RMS and the TSA RMS, is an indicator of heath wear,
Energy Operator (EO) Kurtosis, The Energy Operator is the product of gear mesh amplitude and phase and detect scuffing/pitting wear,
EO Crest Factor, the Energy Operator is the product of gear mesh amplitude and phase and detect scuffing/pitting wear normalized for torque,
Figure of Merit 0, The zero-order figure of merit is generalized gear fault indicator sensitive to wear/scuffing and tooth bending,
SMLF, Sideband Modulation Lifting Factor is sensitive to tooth damage or misalignment,
Narrow Band (NB) Kurtosis is the Bandpass filtered TSA, an intermediate step to the Amplitude Modulation (AM) and Frequency Modulation (FM) Analysis,
NB Crest Factor, which is less sensitive to torque and can indicate a cracked tooth,
AM RMS, the RMS of the envelope of the band passed TSA, is sensitive to tooth damage,
AM Kurtosis, the kurtosis of the envelope of the band passed TSA, is sensitive to tooth damage,
FM RMS, the RMS of the instantaneous frequency of the shaft, this analysis is sensitive to tooth damage,
FM Kurtosis, the Kurtosis of the instantaneous frequency of the shaft, this analysis is sensitive to tooth damage, and
Gear Mesh Energy, which is a requirement for CAP753.
Condition indicators for bearings may include:
Cage Energy, Envelope Bearing Cage Energy,
Ball Energy, Envelope Bearing Ball/Roller Energy,
Inner Race Energy, Envelope Bearing Inner Race Energy,
Envelope Outer Race Energy, Envelope Bearing Outer Race Energy,
Shaft Tick, Envelope 1/Rev Indicator of Mechanical Looseness or Gear Fault, and
Temperature, the smart sensor measured temperature, which is a late state indicator.

Implementation of Analysis Using Single Highspeed Smart Sensor

For engine monitoring of the compressor and turbine section, the smart sensor receives configuration and meta data from the OBCU and generates a tachometer signal from the vibration data itself (i.e., based on tach-from-vibration determinations) that sensor monitors. With the locally created tachometer values, the sensor processes the configured shaft, gear, and bearing data, and reports the CIs to the OBCU when the calculations are complete.

In operation, the OBCU runs a regime recognition process, which determines the aircraft's current state. The regime includes a digital presentation of a binary flag. This flag, when reported, informs the OBCU what commands can be performed.

There are a number of commands, such as calculate run time, flight time, perform data download, or perform acquisition data for a specific component, which are determined at least in part by the current regime that the aircraft is determined to be in.

The commands are run by a script. The script allows the OBCU to marshal configuration data for a specific HSS. Included in that configuration is parameter RPM data (either gas compressor percent RPM or power turbine percent RPM, as appropriate), the conversion factor that allows percent RPM to be converted to Hz, and the shaft harmonic of that frequency. The HSS smart sensor uses this meta data for the tach-from-vibration determinations.

For example, in an example of a script doing analysis on the power turbine section, the power turbine shaft rate is reported as 100% by the parameter data interface, which may correspond to 32,175 RPM or 536 Hz. The power turbine shaft has a 35-tooth pinion. The $35^{th}$ harmonic frequency is then 18,769 Hz. The OBCU would pass the conversion factor of 18769 to the HSS. Gear mesh are often used for tach-from-vibration processing as its large signal source. Similarly, if the compressor shaft rate at 100% is 850 Hz, then, because of blades on the compressor, there is a large $36^{th}$ harmonics. The configuration conversion factor would be 30,600. If the NG parameter value was 85%, then the tach-from-vibration bandpass filter would be centered at 30,600×0.85=26,010 Hz.

In addition to the configuration, the ratio of the tach-from-vibration value from the turbine shaft (e.g., shaft S6, which by default has a ratio of 1), to the other shaft under analysis is needed. In this notional example, the analysis for the power turbine section includes the torquemeter gear shaft (S7), the power output drive shaft (S8), an idler shaft (S9) and the N2 Tach, and PMS Drive Shaft (S10). The ratio from S6, which has a 35-tooth pinion to S7, which has a 107-tooth Torquemeter Gear, is then 35/107, or 0.3271. Hence, in this method, the TSA can be calculated for each shaft from the tach-from-vibration algorithm because the ratio from one shaft to another can be exactly calculated and stored in configuration.

After the HSS has calculated all of the CIs associated with each shaft, gear, and bearing being monitored, the CIs are marshalled by the OBCU and written to a CI file.

At the end of the flight, the regime recognition algorithm detects vehicle shut down, at which point the data may be download from the OBCU.

Regime recognition can be a key part of monitoring engine components. Regime determines the vehicle state, e.g., whether it is accelerating, is straight and level, what the airspeed is, so that a decision can be made about whether and when it is appropriate to perform an acquisition, and if so, what type of configuration to use. As used herein, configuration is the term for the ratio from a given tachometer to a shaft under analysis, and which, if any, gears/bearings are associated with the shaft.

The regime recognition algorithm could be a deep learning/artificial neural network, if/then/else case tree, Bayesian classifier, or another algorithm for classification. A classification algorithm takes parameter inputs such as engine RPM, yaw rate, shaft acceleration, and airspeed to determine an appropriate action to take while in that regime. The output of the regime processes is an action that can be described as an integer representation of a binary value.

Regime recognition is a continuous process, sampling the vehicle parameter at a greater sample rate than the "bandwidth" of the vehicle. For many vehicles, such as an aircraft, calculating regime at 8 Hz is generally fast enough to ensure that the system does not miss any unknown states. For these applications, at 8 Hz, the regime algorithm is called and decisions are made based on regime, defining when to accrue usage of the vehicle (e.g., run time, flight time), and when it is appropriate to perform analysis for monitored components.

As an example, a HUMS may have the following actions that are desired to be known:

If Engine Run time (ERT) is accrued,

If Flight Time (FT) is accrued,

If a mechanical diagnostics (MD) acquisition can be performed,

If a rotor track and balance (RTB) acquisition can be performed, and/or

If the wireless communications (XMIT) can be on for downloading the operations (indicating that the operation had terminated).

A binary mask integer representation of a vehicle with a four-speed transmission and a high/low transfer case, could be defined as presented in Table 2.

TABLE 2

| BIT | ACTION | INTEGER (IF ACTIVE) | HEXIDECIMAL |
|---|---|---|---|
| 0 | XMIT(download or upload data) | 1 | 01 |
| 1 | Rotors/Engine Turning (1)/ Stopped (0) | 2 | 02 |
| 2 | Flight Time (1)/ Stopped (0) | 4 | 04 |
| 3 | Drivetrain/Power Turbine Diagnostics | 8 | 08 |
| 4 | Compressor Diagnostics | 16 | 10 |
| 5 | Rotor Track and Balance | 32 | 20 |
| 6 | Tail Rotor Balance | 64 | 40 |
| 7 | Engine Performance | 128 | 80 |
| 8 | Collect Raw Data Once | 256 | 100 |

For example, if the vehicle is traveling straight and level at 60 Knots (which corresponds to a regime in which RTB can be performed), and it is appropriate to perform drivetrain and compressor turbine analysis, then the bit flag for this would be 2+4+8+16+32 or 62, because the:

rotors are turning (accrue run time), the vehicle is flying, which allows the accrual of flight time and distance driven (when flag bit 2 is active, the vehicle speed is multiplied by $\frac{1}{28800}$, the distance traveled in $\frac{1}{8}^{th}$ of a second, and added to the current distance), and it is appropriate to acquire data using a configuration that defines the associated shaft/gear/bearings and ratio for both the drivetrain/turbine section, compressor section, and RTB.

Drivetrain diagnostics can be performed with the turbine section diagnostics, as the drivetrain RPM/rates are a function of NP, the percent RPM of the power turbine. The configuration for each HSS would have a different conversion factor. For example, if the transmission input shaft rate at 100% is 6000 RPM, with 19 teeth, then the OBCU published conversion factor for HSS4 (input shaft) would be 6000/60*19 or 1900.

Examples of possible regimes for a two engine helicopter are given in Table 3 (in which OEI stands for "one engine inoperative").

TABLE 3

0 "Power On Aircraft, Not Turning"
1 "Power On Aircraft, Idle (67%), OEI"
2 "Power On Aircraft, Idle (67%)"
3 "Shutdown (mr < 50%, max N2 < 24%)"
4 "Power On Aircraft, RPM (100%), OEI"
5 "Power On Aircraft, RPM (100%)"
6 "Transition from Idle to Flight RPM"
7 "Transition from Flight to Idle RPM"
8 "Hover"
9 "Left Hover Turn"
10 "Right Hover Turn"
11 "OEI Hover"
12 "Level Flight up to 40 Knots"
13 "Left Turn Flight up 40 Knots"
14 "Right Turn Flight up 40 Knots"
15 "OEI 40 Knots"
16 "Level Flight 50 Knots"
17 "Left Turn Flight 50 Knots"
18 "Right Turn Flight 50 Knots"
19 "OEI 50 Knots"
20 "Level Flight 60 Knots"
21 "Left Turn Flight 60 Knots"
22 "Right Turn Flight 60 Knots"
23 "OEI 60 Knots"
24 "Level Flight 70 Knots"
25 "Left Turn Flight 70 Knots"
26 "Right Turn Flight 70 Knots"
27 "OEI 70 Knots"
28 "Level Flight 80 Knots"
29 "Left Turn Flight 80 Knots"
30 "Right Turn Flight 80 Knots"
31 "OEI 50 Knots"
32 "Level Flight 90 Knots"
33 "Left Turn Flight 90 Knots"
34 "Right Turn Flight 90 Knots"
35 "OEI 50 Knots"
36 "Level Flight 100 Knots"
37 "Left Turn Flight 100 Knots"
38 "Right Turn Flight 100 Knots"
39 "OEI 100 Knots"
40 "Level Flight 110 Knots"
41 "Left Turn Flight 110 Knots"
42 "Right Turn Flight 110 Knots"
43 "OEI 110 Knots"
44 "Level Flight 120 Knots"
45 "Left Turn Flight 120 Knots"
46 "Right Turn Flight 120 Knots"
47 "OEI 120 Knots"
48 "Level Flight 130 Knots"
49 "Left Turn Flight 130 Knots"
50 "Right Turn Flight 130 Knots"
51 "Decent"
52 "70 Knot letdown"
53 "Autorotation"
54 "Climb"
55 "Pullout"
56 "Pushover"

Commanded Acquisitions and Publishing of Configuration

Regime recognition occurs periodically, returning (at 8 Hz, for example) the current regime, which includes the bit flag. The OBCU then determines an action to be carried out, if appropriate, based on the flag. The OBCU action is controlled by the flag, which allows the appropriate configuration to be selected and a command to be sent to the sensors, such as to acquire and process data. The OBCU determines this behavior from a script. A script provides the rules for what to do and when to do it. For example, a script 3 (shown below) describes a process in which if the time since the last acquisition has been greater than two minutes and the current regime flag is 8 (e.g., regime 20, Level Flight 60 Knots), the script is processed to perform data acquisition an analysis.

Script 3:

```
<script index="3" period="2M" channel="1" init="0" f="8"
desc="Perform Acquisition" actcode=" ACQ" >
    < hss id="1" sampcode="23438" secs="6" />
    < hss id="2" sampcode="46875" secs="3" />
    < hss id="3" sampcode="46875" secs="3" />
    < hss id="4" sampcode="93750" secs="2" />
    < hss id="5" sampcode="93750" secs="2" />
    < hss id="6" sampcode="93750" secs="2" />
    < hss id="7" sampcode="46875" secs="1" />
    < hss id="8" sampcode="46875" secs="1" />
    < hss id="9" sampcode="46875" secs="1" />
    < hss id="10" sampcode="46875" secs="2" />
</script>
```

In script 3, HSS 5 and 6 (associated with the engine) are commanded to collect (actcode="ACQ") data for 2 seconds at 93,750 samples per second (sps), synchronously with the other drivetrain sensors. This can be done because the drivetrain and power turbine RPM are informed by the NR percent RPM parameter. Note that the script does not initialize (init="0") the sensors, which is the case for the analog interface. Initialization would be required for the analog or HSS bus sensor interface.

If script 3 has run within the last two minutes, the acquisition does not occur. Serially, the OBCU sends a test to script 4 (below), which performs analysis on the compressor section, and then script 5 (below), which performs RTB acquisition. Note that CAM 52 is the tachometer needed for phase while CAM 60 is the tracker interface to measure blade tack height.

Script 4:

```
<script index="4" period="2M" channel="2" init="0" f="16"
desc="Perform Acquisition" actcode=" ACQ" >
    < hss id="5" sampcode="93750" secs="2" />
    < hss id="6" sampcode="93750" secs="2" />
</script>
```

Script 5:

```
script index="5" period="1M" channel="2" init="0"
f="16" desc="Perform Acquisition" actcode="ACQ" >
    < hss id="12" sampcode="2930" secs="6" />
    < hss id="13" sampcode="1000" secs="6" />
    < cam id="52" sampcode="" secs="6" />
    < cam id="60" sampcode="" secs="6" />
</script>
```

The ability of an HSS to perform the analysis is based on tach-from-vibration data processing to create tachometer signal, which is derived from the measured vibration data itself. In general, tach-from-vibration determinations use a two-step process to calculate a local tachometer.

Step one is to ideally bandpass and create an analytic signal in one functional procedure. Step two is to use a jitter reduction model to remove noise (jitter) from the reconstructed tachometer signal that is not associated with changes in machine rate. Preferably, this may be implanted in an edge processing smart sensor, where cost and weight or other issues can be better addressed by a lower cost condition monitoring system.

An example of pseudo code to recover a tachometer signal from vibration (step one) is:

Define the Sample Rate=sr (from the appropriate script).
 The number of data points of vibration data, n=sr× acquisition length in seconds, then:

Calculate the next larger radix-2 length for the FFT. nRadix=2^ceil(log₂(n)).

Calculate the low and high bandwidth index (bwlow, bwhigh), which are centered on a known gear mesh or shaft rate.

Take the zero padded FFT of the vibration data.

Zero the FFT from zero to bwlow, and from bwhigh to nRadix.

Take the inverse FFT, generating the analytic signal.

Calculate the unwrapped argument of the signal from 1 to n time series.

Normalize the time series of radians by the shaft harmonic. For a simple shaft, this value is 1. If the shaft has a gear, the gear mesh is used. This is the number of teeth of the gear (assuming $1^{st}$ harmonics).

Interpolate the number of indexes for every $2\pi$ radians.

Normalized to tachometer zero crossing times by sr.

A bandpass filter is the convolution of a low pass filter with a high pass filter. These filters are implemented as Finite Impulse Response (FIR) filters to improve their stability. However, even rather large filters have a poor response, and so an idealized bandpass filter may be used.

Another technique is to develop the analytic signal using an ideal filter. This can be completed in a single functional process. The analytic signal is defined for real the real-valued signal s(t) by Equation 1:

$$S(f) = F\{s(t)\} \quad \text{(Equation 1)}$$

where F is the Fast Fourier Transform and where:

$$S_a(f) = S(f), f = 0 \quad \text{(Equation 2)}$$

$$S_a(f) = 2S(f), f > 0 \quad \text{(Equation 3)}$$

$$S_a(f) = 0, f < 0 \quad \text{(Equation 4)}$$

$$s_a(t) = F^{-1}(S_a(f)) \quad \text{(Equation 5)}$$

S(f), as noted, is the Fourier transform of s(t).

For a signal which is sampled at 97,656 samples per second, for six seconds, the total length of s(t) is n, which has 585,936 data points. As noted, radix 2 lengths for the Fast Fourier Transform (FFT) may be preferably used. By zero padding the FFT to the next larger radix 2 value, 2^20 or 1,048,576, the index representing the cutoff frequency for the bandpass values are: bwlow=910 Hz/97656*1048576=9771, and bwhigh=960/97656*1048576=10308. Then the bandpass analytic signal can be defined by Equation 6:

$$S_a(f) = 2S(f), bwlow \leq f \leq bwhigh \quad \text{(Equation 6)}$$

$$S_a(f) = 0, f < bwlow, f > bwhigh \quad \text{(Equation 7)}$$

$$s_a(t) = F^{-1}(S_a(f)) \quad \text{(Equation 8)}$$

There is no need to multiply by two (as per a typical Hilbert transform) because the argument (e.g., angle) of interest is the arctangent ratio of the imaginary parts of $s_a(t)$ and the real parts of $s_a(t)$. The idealized band pass function rejects all signals not associated with the desired passband.

This idealized filter allows for a higher signal to noise ratio and improved reconstruction of the tachometer signal from vibration. This tachometer signal is recovered from the arctangent of the analytic signal.

Further, the arctangent function returns radians between 0 to $\pi$ and $-\pi$ to 0. However, the evolution of the angle represents the incremental increase in phase for each sample in time. For example, the phase of the analytic signal for three cycles is $2\pi \times 3$ or $6\pi$. The arctangent of that signal will be $-\pi$ to $\pi$ for 3 cycles. The result of the arctangent must be unwrapped to capture the incremental increase in angle versus time. Unwrapping of the angle requires keeping track of the previous angle and current angle. The current angle is added to the previous angle, except when the returned arctangent goes from $\pi$ to $-\pi$. In this case, $\pi$ is added to the returned value to correct for the case when the returned value is between $-\pi$ to 0.

After unwrapping the phase angle, the units are in radians per sample. While the FFT and inverse FFT are operated on the radix 2 length (in this case 1048576), the argument and phase angle computation are performed only on the original sample length, n. Note that this time series of radians is for the gear mesh. To convert to radians per revolution of the shaft, the time series is divided by the number of teeth on the gear. However, it may be that the most reliable gear mesh tone is the $2^{nd}$ or $3^{rd}$ harmonic, in which case the passband is adjusted accordingly, and the time series of radian angle is divided by two times the number of teeth for the $2^{nd}$ harmonic.

The resulting time series represents the radian angle of the shaft, where each index advances the angle in time by dt, or 1/sample rate. Every $2\pi$ radians represent one shaft revolution. Because one is interested in the time, every $2\pi$, a form of interpolation is needed. For example, consider that the index just prior to $2\pi$ is 6.282780795474 (or 0.0004 less than $2\pi$) at array index 3395, while at index 3396, the radian value is 6.284629142378, or 0.0014 greater than $2\pi$. Interpolating between the index 3395 and 3396 yields a radian value of $2\pi$. In this case, the interpolated value is 3395.21885053316. Now the zero cross time is calculated by taking each interpolated value and dividing by the sample rate. The zero-cross time for 3395.21885053316 is 0.03476713 seconds.

This interpolation gives the number of indexes, and thus time, for each revolution. This estimate of the tachometer zero cross signal may be corrupted by noise. Tachometer jitter may be contained by a low-frequency component associated with the engine control unit and random higher frequency components and gear fault detection may be improved by using zero phase, low order Infinite Impulse Response (IIR), backward/forward filtering. As noted previously, both FIR and IIR filters bandwidth are defined by the 3 dB reduction in signal energy. The filter does not remove all signals above the bandwidth, and in fact, reduces up to 50% of the signal energy below the cutoff.

The idealized filter using the FFT processing is zero phase as well. The improved analysis (step two) proceeds similarly to the forward/backward process and includes the following steps:

Take the pseudo derivative of the tachometer signal

Calculate the radix-2 length of the pseudo derivative signal of length n

Zero pad the array from n to the radix-2 length

Calculate the bandwidth index of the FFT

Idx=floor(bandwidth*radix-2 length/2)

Bandwidth is a normalized value, typically 0.12

Take the real FFT of the zero padded derivative signal

Set the real and imaginary parts of the FFT from Idx to the radix-2 length

Take the inverse real FFT.

Reconstruct the tachometer signal by taking the pseudo integral of the signal

Tachometer from Vibration Configuration

The configuration for the tach from vibration sensor (type=hs-tachfvibe), as noted, needs to support the analysis of shaft, gears, and bearings, without a physical tachometer for zero cross time vector. From the tach from vibration analysis description, an approximation for the shaft rate is needed. The configuration will therefore need to allow the OBCU to retrieve this data (which is proportional to vehicle speed) and apply it to the analysis. Known speed comes from the analog/ARINC parameter interface by parameter ID. The following configuration shows the schema to allow tach from vibration to be calculated on a complex turboshaft, turboprop or turbofan with twin spools.

The acquisition regime flag (acqcf fg) 8 is associated with the drivetrain. The acqcf defines the tach-from-vibration T2 synthetic tachometer for analysis on shafts S6, S7, S8, S9, and S10, with bearing window analysis W3 and W4. The schema defines that S6 (the power turbine shaft) with pinion G8 (37 tooth) is has a ratio 1. This defines the tach T2 generated from tach from vibration and defines the gear analysis associated with S7 as G7 and G8 (using gear tooth 70 and 37, respectively). Further, bearing analysis window W4, bearings W, X, Y, Z, AA and BA (with their respective bearing rates) use a window analysis from 16.0 kHz to 19.5 kHz, with a Welches' spectrum length of 4096, with 2048 overlap. Again, this configuration is published to the sensors when Script 3 is executed by the OBCU.

The defining schema for the tach analysis itself uses the keyword tv. Note that the rpmPID (rpm parameter ID) is 20, from L/H Engine NP parameter. The ratio will always be 1.0. The rpmfrq is the factor that converts percent RPM to frequency, and rpmh define this frequency as the $35^{th}$ harmonic. Gear tooth mesh harmonics are used as the energy associated with gear mesh are often high. Note that to capture these frequencies an HSS must be designed to have enough bandwidth to capture the signal of interest. This is one reason why the sensor bracket must be stiff.

Regime flag 16, which is called by Script 4, is the configuration the OBCU publishes for the compressor turbine analysis of the engine and an example is given below. The schema is similar to the flag 8 analysis, with different shaft/ratios/gears and bearings. Note that the rpmID is 19, which is the L/H Engine percent NG rpm.

```
<hss id="5" type="hs-tachfvibe" desc="Left Rear Hub" channel="1">
  <acqcfg fg="8"><s>1.0</s><t>T2</t><sh>
S6,S7,S8,S9,S10</sh><w>W3,W4</w></acqcfg>
  <asmcnfg fg="8">
    <s i="S6" r="1.0" nb="4">
      <g i="G7" t="70" b="18" />
      <g i="G8" t="37" b="10" />
    </s>
    <s i="S7" r="0.327102804" nb="4">
      <g i="G9" t="107" b="27" />
      <g i="G10" t="42" b="11" />
    </s>
    <s i="S8" r="0.196261682" nb="4">
      <g i="G11" t="35" b="9" />
    </s>
    <s i="S9" r="0.1650382330" nb="4">
      <g i="G12" t="44" b="11" />
    </s>
    <a i="S10" r="0.1370128730" nb="4">
      <g i="G13" t="53" b="14" />
    </s>
    <w i="W3" l="17000" h="23000" pl="2048" ol="1024">
      <b i="Q" s="S8" cg="0.43" bl="7.11" in="6.83" ou="5.17" />
      <b i="R" s="S8" cg="0.43" bl="7.11" in="6.83" ou="5.17" />
      <b i="S" s="S8" cg="0.43" bl="7.05" in="10.78" ou="8.22" />
      <b i="T" s="S8" cg="0.43" bl="6.55" in="9.19" ou="6.81" />
    </w>
    <w i="w4" l="16500" h="19500" pl="4096" ol="2048">
      <b i="U" s="S7" cg="0.43" bl="7.11" in="10.24" ou="7.76" />
      <b i="V" s="S7" cg="0.42" bl="5.25" in="8.15" ou="5.85" />
      <b i="W" s="S6" cg="0.37" bl="3.66" in="6.91" ou="4.09" />
      <b i="X" s="S6" cg="0.43' bl="6.89" in="10.85" ou=:8.15" />
      <b i="Y" s="S6" cg="0.40" bl="4.94" in="8.36" ou="5.64" />
      <b i="Z" s="S6" cg="0.39" bl="4.38" in="4.85" ou="3.15" />
      <b i="AA" s="S6" cg="0.45" bl="9.58" in="13.24" ou="10.76" />
      <b i="BA" s="S6" cg="0.45" bl="9.64" in="11.00" ou="9.00" />
      <b i="CA" s="S9" cg="0.38" bl="3.96" in="6.81" ou="4.19" />
      <b i="DA" s="S10" cg="0.38" bl="3.96" in="6.81" ou="4.19" />
      <b i="EA" s="s10" cg="0.43" bl="6.89" in="10.75" ou="8.15" />
    </w>
    <tv i="T2" p="1" r="1.0" rpmpid="20" rpmfrq="18768.862" rpmh="35" />
  </asmcnfg>
  <acqcfg fg="16"><s><1.0</s><t>T2</t><sh>S1,S2,S3,S4,S5</SH><w>W1,W2</w></acqcfg>
  <asmcnfg fg="16">
    <s i="S1" r="1.0" nb="4">
      <g i="GR1" t="21" b="5" />
    </s>
    <s i="S2" r="0.244186047" nb="4">
      <g i="GR2" t="86" b="21" />
      <g i="GR3" t="26" b="6" />
    </s>
    <s i="S3" r="0.082452431" nb="4">
      <g i="GR4" t="77" b="19" />
    </s>
      <s i="S4" r="0.181395359" nb="4">
```

-continued

```
    </s>
    <s i="S5" r="0.235142119" nb="4">
        <g i="GR5" t="27" b="7"/>
    </s>
    <w i="W1" l="25000" h="332000" pl="8192" ol="4096">
        <b i="A" s="S1" cg="0.64" bl="3.21" in="2.86" ou="5.14" />
        <b i="B" s="S1" cg="0.63" bl="3.35" in="3.31" ou="5.69" />
        <b i="C" s="S1" cg="0.57" bl="7.28" in="6.92" ou="9.08" />
        <b i="D" s="S1" cg="0.57" bl="6.55" in="6.81" ou="9.19" />
        <b i="E" s="S1" cg="0.60" bl="4.14" in="4.38" ou="6.62" />
    </w>
    <w i="W2" l="18000" h="21000" pl="8192" ol="4096">
        <b i="F" s="S2" cg="0.57" bl="6.89" in="8.15" ou="10.85" />
        <b i="G" s="S2" cg="0.66" bl="2.76" in="2.70" ou="5.30" />
        <b i="H" s="S3" cg="0.62" bl="3.96" in="4.19" ou="6.81" />
        <b i="I" s="S3" cg="0.65" bl="2.96" in="3.12" ou="5.88" />
        <b i="J" s="S3" cg="0.57" bl="6.89" in="8.15" ou="10.85" />
        <b i="K" s="S3" cg="0.63" bl="3.66" in="4.09" ou="6.91" />
        <b i="L" s="S5" cg="0.57" bl="6.89" in="8.15" ou="10.85" />
        <b i="M" s="S4" cg="0.66" bl="2.76" in="2.70" ou="5.30" />
        <b i="N" s="S3" cg="0.62" bl="3.96" in="4.19" ou="6.81" />
        <b i="O" s="S3" cg="1.93" bl="8.76" in="9.24" ou="17.41" />
    </w>
    <tv i="T2" p="1" r="1.0" rpmpid="19" rpmfrq="17851.0" rpmh="21" />
    </asmcnfg>
</hss>
```

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for monitoring components of an engine of an aircraft comprising:
a gas compressor turbine of the engine;
a power turbine of the engine;
a turboshaft gearbox;
an accessory gearbox in the turboshaft gearbox and configured to be driven by the gas compressor turbine;
a power gearbox in the turboshaft gearbox and configured to be driven by the power turbine; and
a sensor positioned on the turboshaft gearbox and configured to detect vibration signals related to components of both the gas compressor turbine and the power turbine;
wherein the sensor is configured to determine, based on the vibration signals, a condition indicator representative of a condition of a monitored component of the gas compressor turbine and a condition indicator representative of a condition of a monitored component of the power turbine.

2. The system of claim 1, wherein the sensor is an edge processing smart sensor having a board assembly supported by a potting material, and a sensor lead connected to the board assembly.

3. The system of claim 2, further including an on-board control unit in communication with the sensor and configured to receive a plurality of inputs from a plurality of instruments on the aircraft, wherein the on-board control unit is configured to determine a current regime of the aircraft based on the plurality of inputs and wherein, based on the current regime, the on-board control unit is configured to execute a script for directing the sensor to acquire vibration data for a specified time at a sample rate.

4. A system for monitoring components of a turboshaft, turboprop, or twin spindle turbofan engine of an aircraft comprising:
a gas compressor turbine of the engine;
a power turbine of the engine;
an accessory gearbox configured to be driven by the gas compressor turbine;
a power gearbox configured to be driven by the power turbine;
a sensor positioned on a turboshaft gearbox and configured to detect vibration signals from components of both the gas compressor turbine and the power turbine; and
an on-board control unit in communication with the sensor and configured to receive inputs from a plurality of instruments on the aircraft,
wherein the on-board control unit is configured to determine a current regime of the aircraft based on the inputs and wherein, based on the current regime, the on-board control unit is configured to execute a script for directing the sensor to acquire vibration data for a specified time at a sample rate representative of the vibration signals.

5. The system of claim 4, wherein, upon acquiring the vibration data, the sensor determines a condition indicator representative of a condition of a monitored component of the gas compressor turbine and a condition indicator representative of a condition of a monitored component of the power turbine.

6. The system of claim 5, wherein the monitored component of the gas compressor turbine is a shaft and wherein the shaft includes one or more associated gears and one or more associated bearings.

7. The system of claim 6, wherein the on-board control unit receives the condition indicator of the monitored component of the gas compressor turbine from the sensor and determines a remaining useful life for the monitored component of the gas compressor turbine.

8. The system of claim 7, wherein the on-board control unit receives the condition indicator of the monitored component of the power turbine from the sensor and determines a remaining useful life for the monitored component of the power turbine.

9. The system of claim 8, wherein the sensor is an edge processing smart sensor, the sensor including a board assembly supported by a potting material, and a sensor lead connected to the board assembly.

10. The system of claim 9, wherein the sensor includes a pair of sensor leads, including a male lead and a female lead.

11. The system of claim 5, wherein the sensor is mounted on the turboshaft gearbox via a mounting bracket.

12. The system of claim 11, wherein the accessory gearbox and the power gearbox are within the turboshaft gearbox, and wherein the sensor is positioned and configured to measure vibration from both the accessory gearbox and the power gearbox.

13. A method for monitoring components of a turbine engine of an aircraft comprising:
   mounting a sensor on a turboshaft gearbox of the turbine engine such that the sensor is positioned to acquire vibration data related to a gas compressor turbine and a power turbine of the turbine engine;
   acquiring, at the sensor, vibration data related to the gas compressor turbine and the power turbine;
   determining in the sensor based on the vibration data a tachometer value for a monitored component of the gas compressor turbine and a tachometer value for a monitored component of the power turbine;
   determining in the sensor a condition indicator for the monitored component of the gas compressor turbine based on the vibration data and the tachometer value for the monitored component of the gas compressor turbine; and
   determining in the sensor a condition indicator for the monitored component of the power turbine of the power turbine based on the vibration data and the tachometer value for the monitored component of the power turbine.

14. The method of claim 13, further including receiving at the sensor a plurality of parameters related to the monitored component of the gas compressor turbine from an onboard control unit on the aircraft.

15. The method of claim 14, further including receiving at the sensor a plurality of parameters related to the monitored component of the power turbine from the onboard control unit on the aircraft.

16. The method of claim 15, further including determining a current regime of the aircraft at the onboard control unit.

17. The method of claim 16, further including determining whether the acquiring vibration data related to the monitored component of the gas compressor turbine is appropriate based on the current regime.

18. The method of claim 16, further including determining whether the acquiring vibration data related to the monitored component of the power turbine is appropriate based on the current regime.

* * * * *